United States Patent [19]

Hurwitz

[11] Patent Number: 5,884,041
[45] Date of Patent: *Mar. 16, 1999

[54] METHOD AND APPARATUS FOR MONITORING AUTO-NEGOTIATION PROGRESS

[75] Inventor: Walter K. Hurwitz, Sunnyvale, Calif.

[73] Assignee: ICS Technologies, Inc., Valley Forge, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 617,515

[22] Filed: Mar. 13, 1996

[51] Int. Cl.[6] .............................. H04J 3/02; G06F 11/00
[52] U.S. Cl. ................................ 395/200.58; 395/200.54; 395/200.57; 370/401; 370/231; 370/236
[58] Field of Search ........................... 395/200.02, 200.1, 395/200.11, 200.12, 200, 572; 370/241–245, 248, 466, 401, 231, 236

[56] References Cited

U.S. PATENT DOCUMENTS

| | | | |
|---|---|---|---|
| 5,257,287 | 10/1993 | Blumenthal et al. | 375/292 |
| 5,404,544 | 4/1995 | Crayford | 395/750.02 |
| 5,432,775 | 7/1995 | Crayford | 370/248 |
| 5,542,047 | 7/1996 | Armstrong | 395/200.54 |
| 5,570,373 | 10/1996 | Wing | 455/423 |
| 5,586,117 | 12/1996 | Edem et al. | 370/466 |
| 5,592,530 | 1/1997 | Brockman et al. | 379/34 |
| 5,610,903 | 3/1997 | Crayford | 370/213 |
| 5,666,359 | 9/1997 | Bennett et al. | 370/358 |
| 5,784,375 | 7/1998 | Kalkunte et al. | 370/448 |

OTHER PUBLICATIONS

Crawford, "Fast Ethernet Gets Plug–and–Play", Wescon/95 Conference Record (Cat. No. 95CH35791), pp. 354–359, IEEE.

*Primary Examiner*—Parshotam S. Lall
*Assistant Examiner*—Bharat Barot
*Attorney, Agent, or Firm*—Townsend and Townsend and Crew LLP

[57] ABSTRACT

A method and apparatus provide for monitoring an auto-negotiation process. A number of intermediate steps in the auto-negotiation process are monitored. A plurality of codes are successively stored in a progress memory to indicate a degree of completion of the auto-negotiation process.

32 Claims, 4 Drawing Sheets

METHOD AND APPARATUS FOR MONITORING AUTO-NEGOTIATION PROGRESS

BACKGROUND OF THE INVENTION

The present invention relates to establishing a link between nodes in a network, and in particular to an auto-negotiation process in an Ethernet network.

Ethernet is a commonly used local area network scheme in which multiple stations are connected together. Typically, only one station can transmit data at a time. A station transmits data in the form of a packet that includes a destination address. The packet propagates throughout the network and is received by all other stations. The addressed station copies the entire packet as it goes by; the others reject the packet after determining that it is addressed to another station.

A media access controller (MAC) serves as an interface between a physical layer device and a system. Most nodes connected to the network includes a MAC which performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC performs preamble generation/removal. The physical layer takes data from the MAC layer, encodes it, and serializes if for transmission on the medium (and the inverse for received transmissions).

Twisted pair Ethernet in accordance with IEEE Standard 802.3 10Base-T is able to use standard voice grade telephone cable employing separate transmit and receive pairs (4 wires). The system uses a star topology. At the center of the star is a "repeater". The repeater (or hub) performs signal amplitude and timing restoration. It takes an incoming bit stream and repeats it to all other ports connected to it (but not back to the originating port). In this sense, the repeater acts as "logical coax", so that any node connected to the network will see another's transmission. Differential signalling is employed with one pair acting as the transmit path, and the other as receive.

The current Ethernet standards are set forth in IEEE Standard 802.3 10Base-T and 100Base-T. An auto-negotiation process is set forth in the Standard. The auto-negotiation process (1) exchanges information about each station, (2) determines the common capabilities of the stations, and (3) selects the highest performance common capabilities to attempt to establish a link, which if successfully established will cause the setting of an auto-negotiation completion bit in a link code word. The link code word also contains other configuration information, such as whether the station supports full or half duplex, TX or FX, etc. Separate bits are also set if the link partner is not auto-negotiation able, by setting the LB_AutoNeg_Able bit (6:XX).

SUMMARY OF THE INVENTION

The present invention provides a method and apparatus for monitoring an auto-negotiation process. A number of intermediate steps in the auto-negotiation process are monitored. A plurality of codes are successively stored in a progress memory to indicate a degree of completion of the auto-negotiation process.

In the preferred embodiment, the code stored overrides the previous code, and increments each time with an incrementing value of the code indicating a degree of progress through the auto-negotiation process. Thus, observation of the progress memory or register will show the degree of completion of the auto-negotiation process, or the point of failure if the auto-negotiation is unsuccessful. The different intermediate progress points where failure can occur will provide valuable information for determining why a link could not be established.

In particular, in a preferred embodiment, the progress monitor will indicate whether the link partner is auto-negotiation compatible, and if not, whether its abilities can be otherwise determined or not. For an auto-negotiation compatible link, the successful exchange of configuration information is indicated, along with an indication of whether there is consistency between the bits during this step and a previous ability determination step. An inconsistency may provide information, for instance, on problems at the remote link partner or noise problems over the interconnection.

For a further understanding of the nature and advantages of the invention, reference should be made to the ensuing detailed description taken in conjunction with the accompanying drawings.

DETAILED DESCRIPTION OF THE PREFERRED EMBODIMENTS

Figure 1:
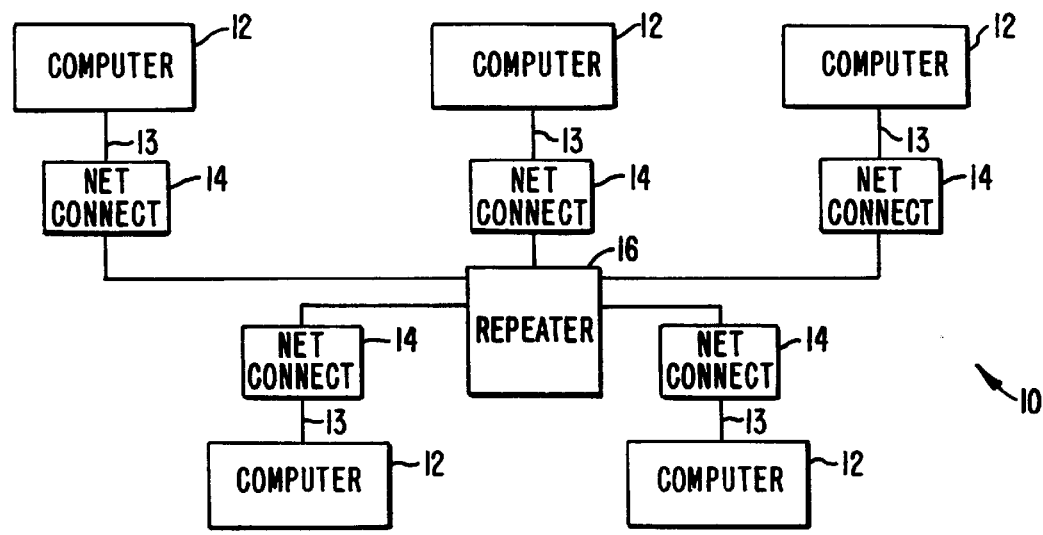
FIG. 1 is a block diagram of a computer network in which the present invention would be practiced.

FIG. 1 is a block diagram of a network 10 including a number of computers 12 connected to network connector interfaces via lines 13. Network connector interfaces 14 are connected to a repeater 16. The connections to repeater 16 can be pairs of twisted-pair wires.

Figure 2:
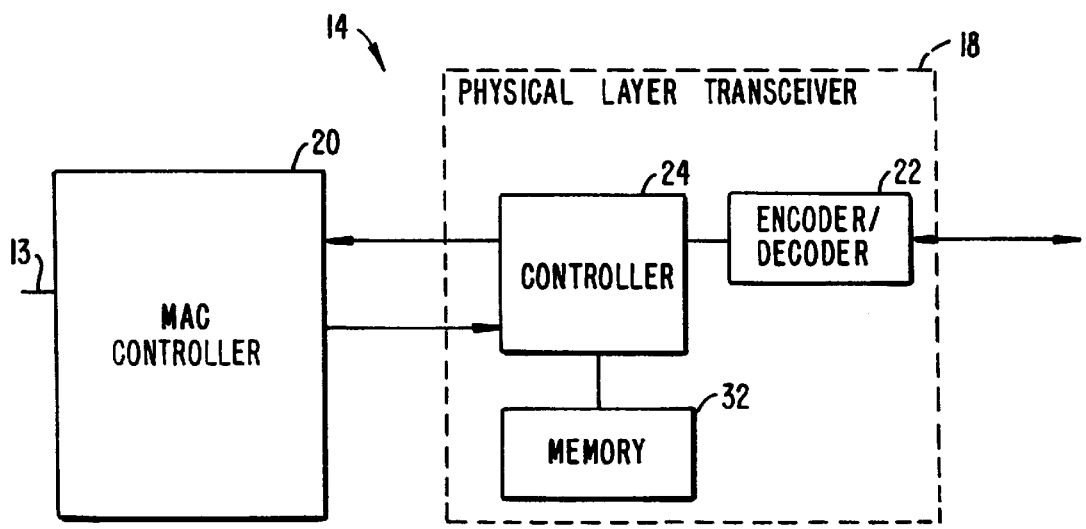
FIG. 2 is a block diagram of a network connector of FIG. 1.

FIG. 2 illustrates more details of a network connector interface 14 which includes a physical layer transceiver 18 and a media access controller (MAC) 20. Transceiver 18 includes an encoder/decoder 22 connected to the network. The encoder/decoder is connected to a MAC 20, which controls sending and receiving data over a bus 13 to a computer 12.

One of the processes executed by transceiver 18 is the establishment of a link with another computer over the network. This will be done, for instance, upon power-up or after the interruption of power. Controller 24 runs an auto-negotiation program to accomplish the establishment of a link, with the program being stored in a memory 32.

Figure 3A:
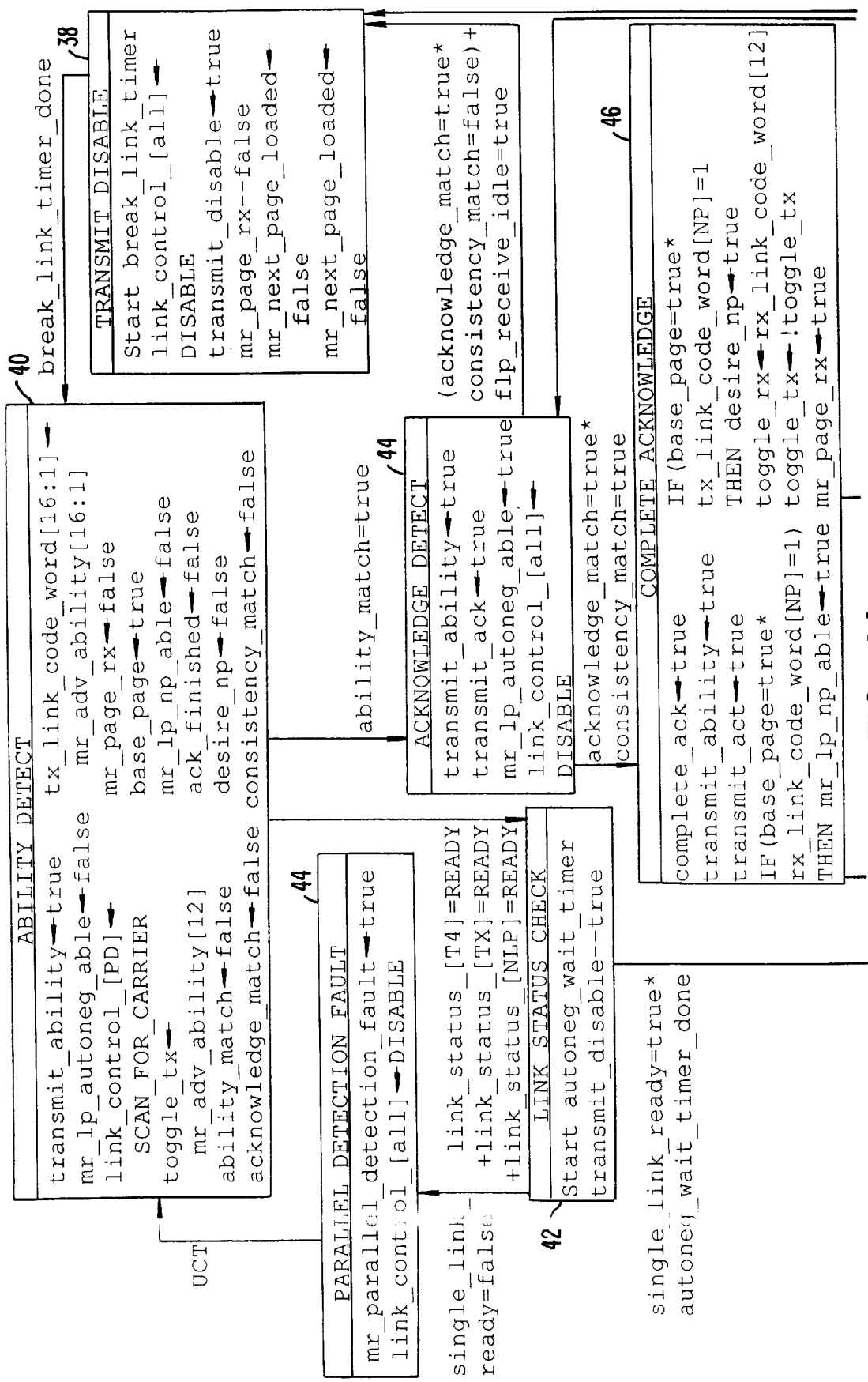
FIGS. 3A and 3B illustrate a state machine diagram of the auto-negotiation process.
Figure 3B:
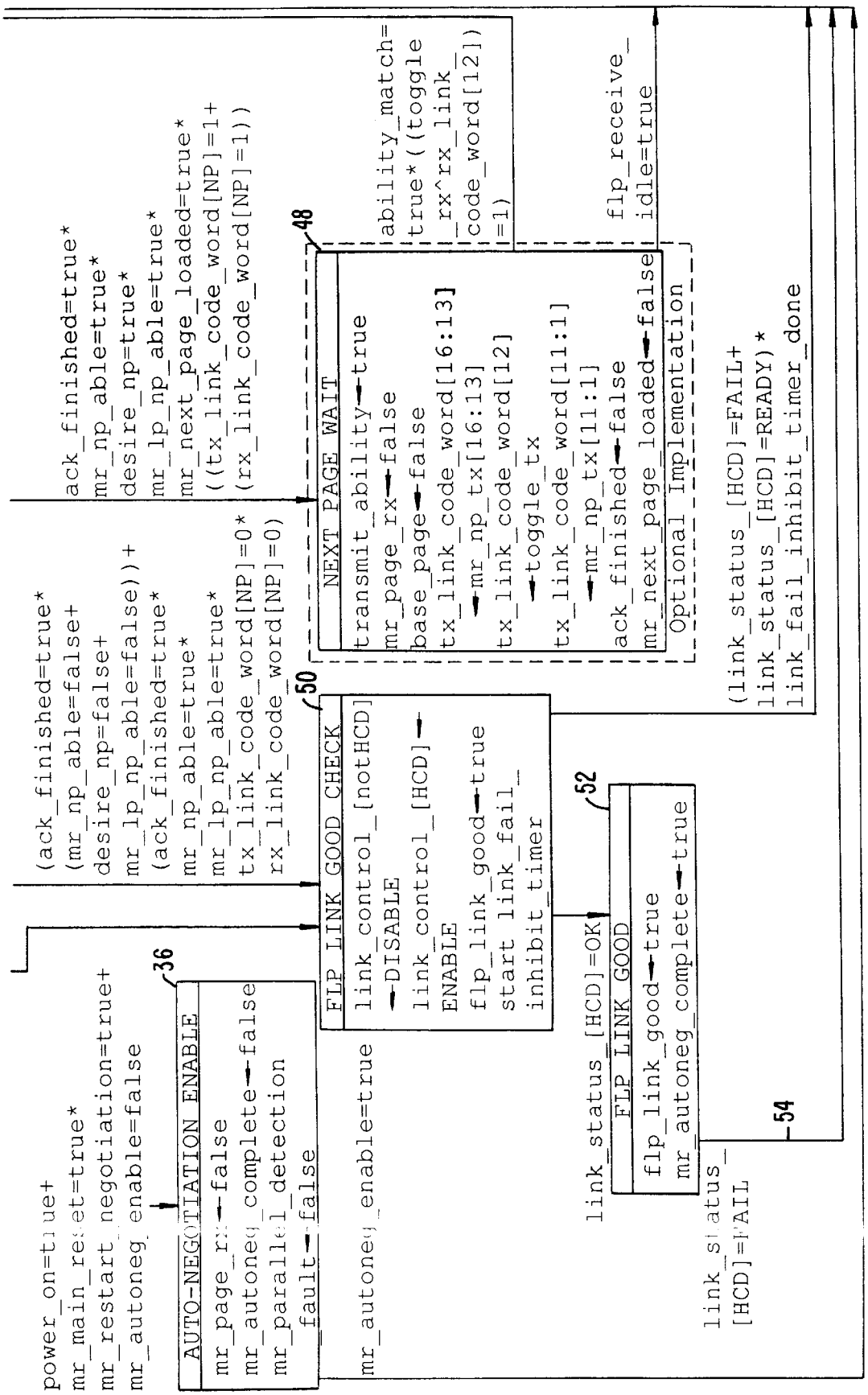

FIGS. 3A and 3B illustrate an arbitration state diagram illustrating the auto-negotiation process set forth in IEEE Standard 802.3. The auto-negotiation process is initiated by enabling the auto-negotiation in a state 36 of FIG. 3B. From there, following the arrows to a transmit disable state 38 of FIG. 3A, transmission is disabled so the auto-negotiation process can be started. In a block 40, a series of steps are performed to determine whether the potential link partner has auto-negotiation capability or not. If the partner does not have auto-negotiation capability, the state transitions to a state 42 for performing link status check steps. If there is an auto-negotiation capability, the state transitions to an acknowledge detect set of steps in state 43.

Acknowledge detect state 43 performs steps including the exchange of acknowledge bits and other data, along with a consistency check in which information exchanged with the link partner is compared to information detected in state 40 to determine if they are consistent. If there is a failure of either the acknowledge or the consistency checks, there is a transition back to transmit disable block 38 to start the process over again.

Upon successful completion of the acknowledge detect state 43, a complete acknowledge state 46 is entered in which there is basically a delay during which the acknowledgement process is completed.

For controllers with enhanced properties, an optional next-page wait state 48 of FIG. 3B can be entered to allow the exchange of additional information between the two link partners, typically about the abilities of the two partners. This can then cause a transition back to acknowledge detect state 43, or upon failure, back to transmit disable state 38.

After completion of complete acknowledge state 46 of FIG. 3A, and assuming there is no next-page wait state, or that the next-page wait state has been completed, the next transition would be to "FLP link good check" state 50 of FIG. 3B. Several steps are performed here to complete the link between the two computers, after which an "FLP link good" state 52 is entered to determine if the link is indeed good. If it is, the state is exited at a point 54, upon which an auto-arbitration complete bit can be set.

A separate path is followed if the link partner does not have auto-negotiation capability. As indicated before, link status check state 42 of FIG. 3A would be entered. If there is a failure here, a parallel detection fault state 44 is entered, with a subsequent return to the ability detect state 40 to restart the process. If there is a successful identification of the abilities of the link partner, there is a transition from state 42 to state 50 of FIG. 3B, and thereafter to state 52. The above arbitration state diagram is set forth in IEEE Standard 802.3, and reference is made thereto for additional details of the auto-negotiation process.

Under normal circumstances, auto-negotiation is able to effortlessly establish a connection with the link partner. There are, however, a number of error situations that prevent auto-negotiation from completing properly. The auto-negotiation progress monitor of the present invention is designed to provide detailed information to a station management entity to assist it in making a connection in the event that auto-negotiation is unable to establish a connection by itself. The station management entity can be a separate server attached to the network which can periodically poll the status of computers on the network. During a normal auto-negotiation operation, the device exchanges capability information with its link partner and then sets the auto-negotiation complete bit in the status register (1:4) (also bit X in the quick poll register) to a logic one to indicate that the information exchange has completed successfully and that auto-negotiation has handed off the link startup process to the negotiated technology. In a preferred embodiment, a quick poll register is provided which also stores a bit X to indicate that the auto negotiation was successfully completed. In addition, the quick poll register stores other important information that a diagnostic query may desire. In particular, a link status bit is stored, along with bits which show what speed and duplex were negotiated. In prior systems, a number of steps were required to extract this information from different registers.

Auto-negotiation can also accommodate legacy 10Base-T and 100Base-TX link partners that do not have auto-negotiation capability. In this case, auto-negotiation identifies the link partner as not being auto-negotiation able by setting the LP__AutoNeg__Able bit (6:xx) to a logic zero, identifies the legacy connection to be made by setting the single bit corresponding to that technology in the AN link partner abilities register (either bit 5:x or 5:y), and finally indicates auto-negotiation complete.

The entire process, in either case, usually takes less than half a second to complete. Typically, management will poll the auto-negotiation complete bit and the link status bit to determine when a connection has been successfully made and then the actual type of connection can be determined by management.

When auto-negotiation fails, auto-negotiation complete may never become true or link status may never become good. Station management can detect this condition and discover why there is a failure to connect by using the detailed information provided by the auto-negotiation progress monitor.

The auto-negotiation progress monitor provides 4 bits of status in the quick poll detailed status register when combined with the auto-negotiation complete bit, as set forth in Table I below.

TABLE I

| Status | Progress Monitor Status Bits | | | |
|---|---|---|---|---|
| | A-N Complete | Bit 2 | Bit 1 | Bit 0 |
| Idle | 0 | 0 | 0 | 0 |
| Parallel Detected | 0 | 0 | 0 | 1 |
| Parallel Detect Failure | 0 | 0 | 1 | 0 |
| Ability Matched | 0 | 0 | 1 | 1 |
| Acknowledge Match Failure | 0 | 1 | 0 | 0 |
| Acknowledge Matched | 0 | 1 | 0 | 1 |
| Consistency Match Failure | 0 | 1 | 1 | 0 |
| Consistency Matched | 0 | 1 | 1 | 1 |
| Auto-Negotiation Completed Successfully | 1 | 0 | 0 | 0 |

As progress is made through the auto-negotiation arbitration state machine, higher status values are locked into the progress monitor. The status value is only allowed to increase until either auto-negotiation is completed successfully or the progress monitor status is read by management. After the status is read by management, the status is reset to the current status of the arbitration state machine. After negotiation has completed successfully any link failure will cause the process to begin anew. This behavior allows management to always determine the greatest forward progress made by auto-negotiation.

Figure 4:
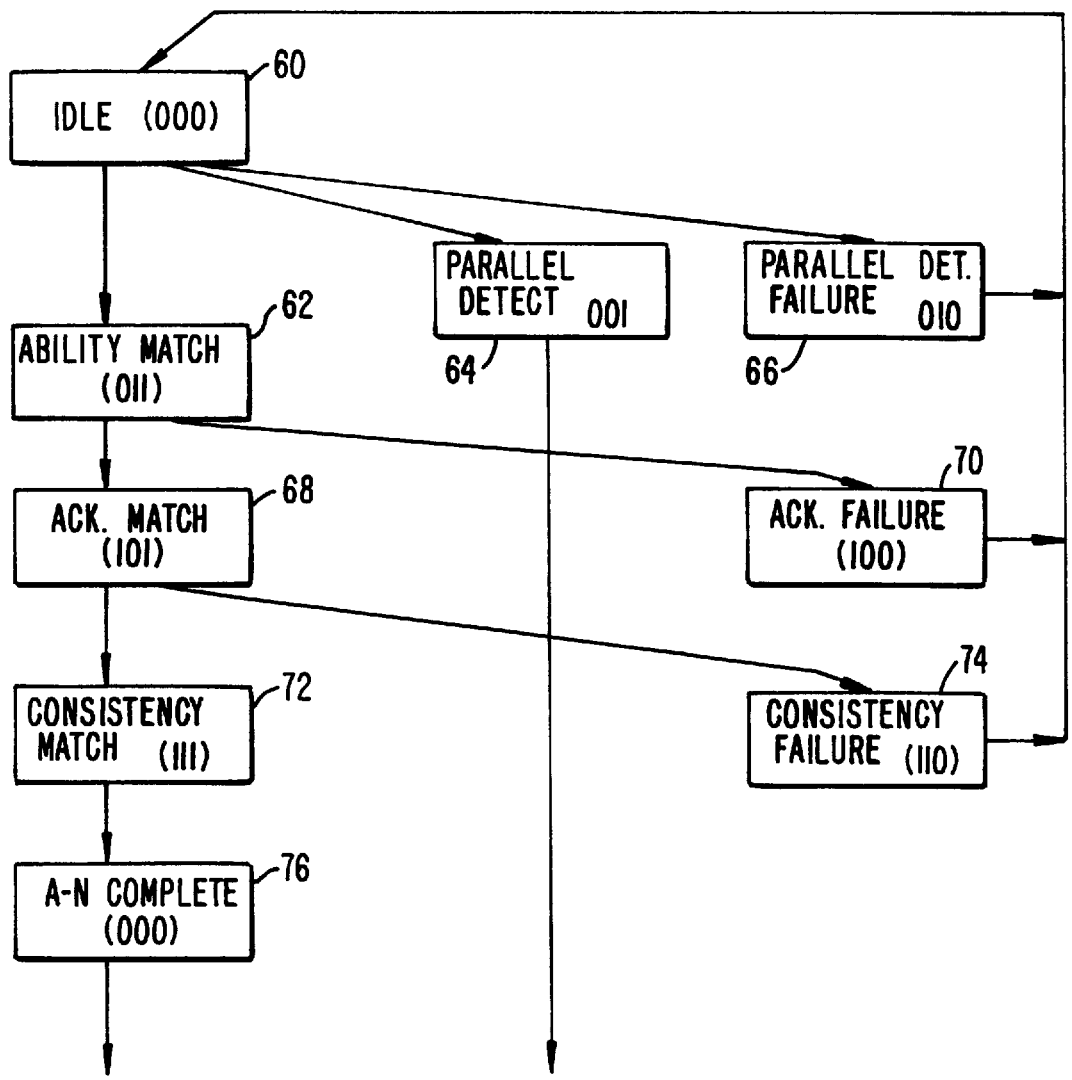
FIG. 4 is a flowchart of the progress monitor of the present invention.

FIG. 4 is a flowchart illustrating the auto-negotiation progress monitor of the present invention. In a first, idle state 60, the value of the progress register is set to 000 (while the auto-negotiation completion bit is at zero as well, as shown in Table I). From step 60, if the link partner is identified as having auto-negotiation capability, and there is a transition to step 4 of FIGS. 3A and 3B, the ability match code 011 is set, as indicated by block 62. Alternately, if there is no auto-negotiation capability, link status block 42 could be entered and either a successful parallel detection is completed with the code being set to 001, as indicated in block 64, or upon a failure, a code of 010 is entered as indicated in block 66.

Assuming auto-negotiation is present in the link partner, when the acknowledge detect block 43 of FIG. 3A is entered, if acknowledgement signals are successfully interchanged, a code of 101 will be written into the register, as indicated by block 68. Alternately, if there is no acknowledgement, a code of 100 is written in, as indicated by acknowledge match failure block 70. If the acknowledgement is indeed completed, then the consistency check is done, and if there is a match, the code of 111 is written into the register, as indicated by block 72, or, alternately upon a failure, a code of 110 is written in, as indicated by block 74. Upon successful auto-negotiation completion, a value of 000 is written into the first three bits, while the auto-negotiation complete bit is set to 1 by the auto-negotiation process, as indicated by block 76 in FIG. 4.

As can be seen, the degree of progress through the auto-negotiation process will be indicated by the code stored in the register. Increasing values of the code indicate further progress through the auto-negotiation process. For instance, if there is a failure and a code of 100 stored, this shows that no acknowledgement was done and that there was a failure before a consistency match was performed. Alternately, if the value 110 was stored upon a failure, this shows a consistency match failure. Thus, two different code values are provided to give an indication of the reason for failure in the single block 43 of FIG. 3A.

Alternately, if the other link partner does not have auto-negotiation, the auto-negotiation complete bit may never be set, but a value of 001 in the progress monitor register will indicate that the abilities have been detected so that communication can commence with the link partner.

As will be understood by those with skill in the art, the present invention may be embodied in other specific forms without departing from the spirit or essential characteristics thereof. For example, a greater number of events could be monitored, with 4 or 5 bits being used. Alternately, different codes could be used to indicate the status of progress through the auto-negotiation process. In another embodiment, the code could be decremented to zero, rather than incremented from zero. Accordingly, for an understanding of the scope of the invention, reference should be made to the appended claims.

What is claimed is:

1. A method for monitoring an auto-negotiation process for establishing a link in a network, comprising:

monitoring a plurality of intermediate steps in said auto-negotiation process, the intermediate steps including transmission of multiple types of information between nodes on said network;

successively storing a plurality of codes in a progress memory element indicating a varying degree of completion of said auto-negotiation process, said plurality of codes being selected from a group of items including an auto-negotiation complete bit and an auto-negotiation intermediate bit, said auto-negotiation intermediate bit indicating a different degree of completion of said auto-negotiation complete bit; and examining said plurality of stored codes to determine a point of failure in said auto-negotiation process.

2. The method of claim 1 further comprising overwriting a previous code for each code generated at a point of greater forward progress through said auto-negotiation routine.

3. The method of claim 2 wherein said overwriting comprises incrementing the value of said code.

4. The method of claim 1 wherein said progress memory element comprises a progress register.

5. The method of claim 1 further comprising establishing said link in accordance with said stored codes if said auto-negotiation process fails.

6. The method of claim 1 further comprising storing, in a quick poll register, a link status bit and a plurality of bits indicating a negotiated speed and duplex.

7. The method of claim 1 wherein said monitoring comprises:

monitoring an ability detect routine to determine if a link partner has auto-negotiation capability;

monitoring a transmission by said link partner to determine its abilities if said link partner does not have auto-negotiation capability;

monitoring an acknowledgement signal exchange;

monitoring a consistency match determining consistency between signals from said link partner during said ability detect routine and said acknowledgement signal exchange; and monitoring a link routine for completing the establishment of a link with said link partner.

8. The method of claim 7 wherein said successively storing comprises:

storing a first code if said transmission monitoring is successful;

storing a second code if said transmission monitoring is not successful;

storing a third code if the link partner has auto-negotiation capability;

storing a fourth code if said acknowledgement signal exchange is not successfully completed;

storing a fifth code if said acknowledgement signal exchange is successfully completed;

storing a sixth code if said consistency match is not successful;

storing a seventh code if said consistency match is successful; and storing an eighth code if said link routine is successful.

9. A method for monitoring an auto-negotiation process for establishing a link in a point-to-point network, comprising:

monitoring a plurality of intermediate steps in said auto-negotiation process, the intermediate steps including transmission of multiple types of information between nodes on said network;

successively storing a plurality of codes in a progress register indicating a varying degree of completion of said auto-negotiation process, said plurality of codes being selected from a group of items including an auto-negotiation complete bit and an auto-negotiation intermediate bit, said auto-negotiation intermediate bit indicating a different degree of completion of said auto-negotiation process than said auto-negotiation complete bit;

overwriting a previous code for each code generated at a point of greater forward progress through said auto-negotiation routine by incrementing the value of said code; and examining said plurality of stored codes to determine a point of failure in said auto-negotiation process.

10. A method for monitoring an auto-negotiation process for establishing a link in a network, comprising:

monitoring an ability detect routine to determine if a link partner has an auto-negotiate capability;

monitoring a transmission by said link partner to determine its abilities if said link partner does not have auto-negotiation capability;

storing a first code if said transmission monitoring is successful;

storing a second code if said transmission monitoring is not successful;

storing a third code if the link partner has auto-negotiation capability;

monitoring an acknowledgement signal exchange;

storing a fourth code if said acknowledgement signal exchange is not successfully completed;

storing a fifth code if said acknowledgement signal exchange is successfully completed;

monitoring a consistency match determining consistency between signals from said link partner during said ability detect routine and said acknowledgement signal exchange;

storing a sixth code if said consistency match is not successful;

storing a seventh code if said consistency match is successful;

monitoring a link routine for completing the establishment of a link with said link partner;

storing an eighth code if said link routine is successful; and examining a selected one of said first through eighth stored codes to determine a point of failure in said auto-negotiation process.

11. The method of claim 10 wherein each of said codes is a multiple digit code stored in a register, and where each of said codes stored overwrites a preceding code stored, such that a code in said register indicates a point of progress through said auto-negotiation process.

12. The method of claim 10 wherein:

said first code is 0011;

said second code is 0001;

said third code is 0010;

said fourth code is 0101;

said fifth code is 0100;

said sixth code is 0111;

said seventh code is 0110; and said eighth code is 1000.

13. The method of claim 10 further comprising exiting said auto-negotiation process if said second, fourth or sixth code is stored, indicating an unsuccessful step.

14. An apparatus for monitoring an auto-negotiation process for establishing a link in a network, comprising:

means for monitoring a plurality of intermediate steps in said auto-negotiation process, the intermediate steps including transmission of multiple types of information between nodes on said network;

a progress memory element;

means for successively storing a plurality of codes in said progress memory element indicating a varying degree of completion of said auto-negotiation process, said means for monitoring and said means for successively storing including a series of program instructions stored in a memory;

a processor for executing said program instructions; and means for examining said plurality of stored codes to determine a point of failure in said auto-negotiation process.

15. The apparatus of claim 14 further comprising means for overwriting a previous code for each code generated at a point of greater forward progress through said auto-negotiation process.

16. The apparatus of claim 15 wherein said means for overwriting comprises means for incrementing the value of said code.

17. The apparatus of claim 14 wherein said progress memory element comprises a progress register.

18. The apparatus of claim 15 further comprising means for resetting said code to zero upon an auto-negotiation failure.

19. The apparatus of claim 14 wherein said means for monitoring comprises:

means for monitoring ability detect routines to determine if a link partner has auto-negotiation capability;

means for monitoring a transmission by said link partner to determine its abilities if said link partner does not have auto-negotiation capability;

means for monitoring an acknowledgement signal exchange;

means for monitoring a consistency match determining consistency between signals from said link partner during said ability detect steps and said acknowledgement signal exchange; and means for monitoring a link routine for completing the establishment of a link with said link partner.

20. The apparatus of claim 19 wherein said means for successively storing comprises:

means for storing a first code if said transmission monitoring is successful;

means for storing a second code if said transmission monitoring is not successful;

means for storing a third code if the link partner has auto-negotiate capability;

means for storing a fourth code if said acknowledgement signal exchange is not successfully completed;

means for storing a fifth code if said acknowledgement signal exchange is successfully completed;

means for storing a sixth code if said consistency match is not successful;

means of storing a seventh code if said consistency match is successful;

means for storing an eighth code if said link routine is successful.

21. An apparatus for monitoring an auto-negotiation process for establishing a link in an point-to-point network, comprising:

means for monitoring a plurality of intermediate steps in said auto-negotiation process, the intermediate steps including transmission of multiple types of information between nodes on said network;

means for successively storing a plurality of codes in a progress register indicating a varying degree of completion of said auto-negotiation process, said plurality of codes being selected from a group of items including an auto-negotiation complete bit and an auto-negotiation intermediate bit, said auto-negotiation intermediate bit indicating a different degree of completion of said auto-negotiation process than said auto-negotiation complete bit;

means for overwriting a previous code for each code generated at a point of greater forward progress through said auto-negotiation routine by incrementing the value of said code;

means for resetting said code to zero upon an auto-negotiation failure; and means for examining said plurality of stored codes to determine a point of failure in said auto-negotiation process.

22. An apparatus for monitoring an auto-negotiation process for establishing a link in a network, comprising:

means for monitoring ability detect steps to determine if a link partner has auto-negotiation capability;

means for monitoring a transmission by said link partner to determine its abilities if said link partner does not have auto-negotiation capability;

means for storing a first code if said transmission monitoring is successful;

means for storing a second code if said transmission monitoring is not successful;

means for storing a third code if the link partner has auto-negotiate capability;

means for monitoring an acknowledgement signal exchange;

means for storing a fourth code if said acknowledgement signal exchange is not success completed;

means for storing a fifth code if said acknowledgement signal exchange is successfully completed;

means for monitoring a consistency match determining consistency between signal from said link partner during said ability detect routine and said acknowledgement signal exchange;

means for storing a sixth code if said consistency match is not successful;

means for storing a seventh code if said consistency match is successful;

means for monitoring a link routine for completing the establishment of a link with said link partner;

means for storing an eighth code if said link routine is successful; and means for examining a selected one of said first through eighth stored codes to determine a point of failure in said auto-negotiation process.

23. The apparatus of claim 22 wherein each of said codes is a multiple digit code stored in a register, and where each of said codes stored overwrites a preceding code stored, such that a code in said register indicates a point of progress through said auto-negotiation process.

24. The apparatus of claim 22 wherein:

said first code is 0011;

said second code is 0001;

said third code is 0010;

said fourth code is 0101;

said fifth code is 0100;

said sixth code is 0111;

said seventh code is 0110; and said eighth code is 1000.

25. The apparatus of claim 22 further comprising means for exiting said auto-negotiation process if said second, fourth or sixth code is stored, indicating an unsuccessful step.

26. An apparatus for monitoring an auto-negotiation process for establishing a link in a network, comprising:

a processor;

a progress memory element; and a memory storing a plurality of instructions, for execution by said processor, for:

monitoring a plurality of intermediate steps in said auto-negotiation process, the intermediate steps including transmission of multiple types of information between nodes on said network;

successively storing a plurality of codes in said progress memory element indicating a varying degree of completion of said auto-negotiation process said plurality of codes being selected from a group of items including an auto-negotiation complete bit and an auto-negotiation intermediate bit, said auto-negotiation intermediate bit indicating a different degree of completion of said auto-negotiation process than said auto-negotiation complete bit; and examining said plurality of stored codes to determine a point of failure in said auto-negotiation process.

27. The apparatus of claim 26 further comprising a station management entity, operably coupled to said processor, configured to assist in establishing said link if said auto-negotiation process fails.

28. A method for monitoring an auto-negotiation process for establishing a link in a network, comprising:

monitoring a plurality of intermediate steps in said auto-negotiation process, the intermediate steps including transmission of multiple types of information between nodes on said network;

successively storing a plurality of codes in a progress memory element indicating a varying degree of completion of said auto-negotiation process, said plurality of codes being selected from a group of items including an auto-negotiation complete bit, a link status bit, and a plurality of bits indicating a negotiated speed and duplex; and examining said plurality of stored codes to determine a point of failure in said auto-negotiation process.

29. The method of claim 28 further comprising overwriting a previous code for each code generated at a point of greater forward progress through said auto-negotiation routine.

30. The method of claim 29 wherein said overwriting comprises incrementing the value of said code.

31. The method of claim 28 wherein said progress memory element comprises a progress register.

32. The method of claim 28 wherein said monitoring includes:

monitoring an ability detect routine to determine if a link partner has auto-negotiation capability;

monitoring a transmission by said link partner to determine its abilities if said link partner does not have auto-negotiation capability;

monitoring an acknowledgement signal exchange;

monitoring a consistency match determining consistency between signals from said link partner during said ability detect routine and said acknowledgement signal exchange; and monitoring a link routine for completing the establishment of a link with said link partner.

* * * * *